(12) United States Patent
Yang

(10) Patent No.: US 11,604,766 B2
(45) Date of Patent: Mar. 14, 2023

(54) METHOD, APPARATUS, DEVICE, STORAGE MEDIUM AND COMPUTER PROGRAM PRODUCT FOR LABELING DATA

(71) Applicant: Beijing Baidu Netcom Science and Technology Co., Ltd., Beijing (CN)

(72) Inventor: Xue Yang, Beijing (CN)

(73) Assignee: Beijing Baidu Netcom Science and Technology Co., Ltd., Beijing (CN)

(*) Notice: Subject to any disclaimer, the term of this patent is extended or adjusted under 35 U.S.C. 154(b) by 50 days.

(21) Appl. No.: 17/445,875

(22) Filed: Aug. 25, 2021

(65) Prior Publication Data

US 2021/0406220 A1    Dec. 30, 2021

(30) Foreign Application Priority Data

Mar. 25, 2021    (CN) .......................... 202110319604.2

(51) Int. Cl.
  *G06F 16/16* (2019.01)
  *G06K 9/62* (2022.01)
(52) U.S. Cl.
  CPC ......... *G06F 16/164* (2019.01); *G06K 9/6263* (2013.01)
(58) Field of Classification Search
  CPC .............................. G06F 16/164; G06K 9/6263
  USPC ........................................................ 707/828
  See application file for complete search history.

(56) References Cited

U.S. PATENT DOCUMENTS

| | | | | |
|---|---|---|---|---|
| 11,003,859 B2 * | 5/2021 | Scriven | .................. | G06F 40/30 |
| 2018/0114099 A1 | 4/2018 | Desai et al. | | |
| 2020/0026967 A1 | 1/2020 | Kartoun et al. | | |
| 2021/0042577 A1 * | 2/2021 | Martin | .................. | G06K 9/623 |
| 2021/0271809 A1 * | 9/2021 | Huang | .................. | G06N 20/00 |
| 2022/0147864 A1 * | 5/2022 | Chang | ................ | G06Q 30/0201 |

FOREIGN PATENT DOCUMENTS

| | | |
|---|---|---|
| CN | 108898162 | 11/2018 |
| CN | 108898162 A | 11/2018 |
| CN | 109190674 | 1/2019 |
| CN | 109784381 | 5/2019 |

(Continued)

OTHER PUBLICATIONS

Carneiro, Gustavo, et al., "Supervised Learning of Semantic Classes for Image Annotation and Retrieval", IEEE Transactions on Pattern Analysis and Machine Intelligence (TPAMI 2007), vol. 29, Issue 3, Mar. 2007, pp. 394-410.*

(Continued)

*Primary Examiner* — Robert Stevens
(74) *Attorney, Agent, or Firm* — Knobbe, Martens, Olson & Bear, LLP

(57) ABSTRACT

A method, an apparatus, an electronic device, a computer-readable storage a medium and a computer program product for labeling data are provided. The method may include: obtaining a labeling accuracy requirement for to-be-labeled data; determining a process monitoring parameter matching the to-be-labeled data; weighting the process monitoring parameter with a coefficient having a corresponding size to obtain a comprehensive accuracy according to dependent and causal relationships between contents of different to-be-labeled data; and outputting, in response to the comprehensive accuracy satisfying the labeling accuracy requirement, labeled data.

19 Claims, 3 Drawing Sheets

(56) References Cited

FOREIGN PATENT DOCUMENTS

| | | |
|---|---|---|
| CN | 109978356 | 7/2019 |
| CN | 110147852 | 8/2019 |
| CN | 111080092 | 4/2020 |
| CN | 111507405 | 8/2020 |
| CN | 111966674 | 8/2020 |
| JP | 2018106662 A | 7/2018 |
| JP | 2020042386 A | 3/2020 |

OTHER PUBLICATIONS

Extended European Search Report received in European Application No. 21193091 dated Mar. 3, 2022 in 10 pages.

\* cited by examiner

METHOD, APPARATUS, DEVICE, STORAGE MEDIUM AND COMPUTER PROGRAM PRODUCT FOR LABELING DATA

CROSS-REFERENCE TO RELATED APPLICATIONS

This application claims the priority of Chinese Patent Application No. 202110319604.2, titled "METHOD, APPARATUS, DEVICE, STORAGE MEDIUM AND COMPUTER PROGRAM PRODUCT FOR LABELING DATA", filed on Mar. 25, 2021, the content of which is incorporated herein by reference in its entirety.

TECHNICAL FIELD

The present disclosure relates to the technical field of data processing, specifically, to the technical fields of artificial intelligence, such as computer vision, natural language processing and cloud services, and in particular, to a method, apparatus, electronic device, computer-readable storage medium and computer program product for labeling fata.

BACKGROUND

With the gradual implementation of artificial intelligence algorithms, more and more data is needed to improve the accuracies of the algorithms, and the quality of data directly affects the accuracies of the algorithms.

In order to deliver higher-quality data, each data party needs to formulate corresponding accuracy control schemas to satisfy the various accuracy requirements proposed by customers. Improving the quality of the data and improving the accuracy of the delivered data have become the keys for labeling enterprises to win in competition.

SUMMARY

Embodiments of the present disclosure provide a method, apparatus, electronic device, computer-readable storage medium and computer program product for labeling data.

In a first aspect, embodiments of the present disclosure provide the method for labeling data, including: obtaining a labeling accuracy requirement for to-be-labeled data; determining a process monitoring parameter matching the to-be-labeled data, where the process monitoring parameter includes at least one of accuracies of multiple dimensions in an increasing order of levels; weighting the process monitoring parameter with a coefficient having a corresponding value to obtain a comprehensive accuracy according to dependent and causal relationships between contents of different to-be-labeled data; and outputting, in response to the comprehensive accuracy satisfying the labeling accuracy requirement, labeled data.

In a second aspect, embodiments of the present disclosure provide an apparatus for labeling data, including: a requirement obtaining unit configured to obtain a labeling accuracy requirement for to-be-labeled data; a process monitoring parameter determining unit configured to determine a process monitoring parameter matching the to-be-labeled data, where the process monitoring parameter includes at least one of accuracies of multiple dimensions in an increasing order of levels; a labeled content weighting unit configured to weight the process monitoring parameter with a coefficient having a corresponding value to obtain a comprehensive accuracy according to dependent and causal relationships between contents of different to-be-labeled data; and a satisfied requirement output unit configured to output, in response to the comprehensive accuracy satisfying the labeling accuracy requirement, labeled data.

In a third aspect, embodiments of the present disclosure provide an electronic device, including: at least one processor; and a memory communicatively connected to the at least one processor, where the memory stores instructions executable by the at least one processor, and the instructions, when executed by the at least one processor, cause the at least one processor to implement the method for labeling data as described in any one of the implementations of the first aspect.

In a fourth aspect, embodiments of the present disclosure provide a non-transitory computer-readable storage medium storing computer instructions, where the computer instructions cause a computer to implement the method for labeling data as described in any one of the implementations of the first aspect.

In a fifth aspect, embodiments of the present disclosure provide a computer program product including a computer program, where the computer program, when executed by a processor, implements the method for labeling data as described in any one of the implementations of the first aspect.

It should be appreciated that the contents described in this section are not intended to identify the key or critical features of embodiments of the present disclosure, nor is it intended to limit the scope of the present disclosure. The other features of the present disclosure will become easy to understand through the following description.

BRIEF DESCRIPTION OF THE DRAWINGS

By reading the detailed description of non-limiting embodiments with reference to the following accompanying drawings, other features, objects and advantages of the present disclosure will become more apparent.

DETAILED DESCRIPTION OF EMBODIMENTS

Example embodiments of the present disclosure are described below in combination with the accompanying drawings, where various details of embodiments of the present disclosure are included to facilitate understanding and should be considered as examples only. Therefore, those of ordinary skill in the art should realize that various changes and modifications may be made to the embodiments described herein without departing from the scope and spirit of the present disclosure. Similarly, for clarity and conciseness, descriptions of well-know functions and structures are omitted in the following description. It should be noted that the embodiments in the present disclosure and the features in the embodiments may be combined with each other on a non-conflict basis.

The acquisition, storage and application of user personal information involved in technical schemas of the present disclosure are in accordance with the provision of relevant laws and regulations, and necessary confidentiality measures are taken, and public order and good customs are not violated.

Figure 1:
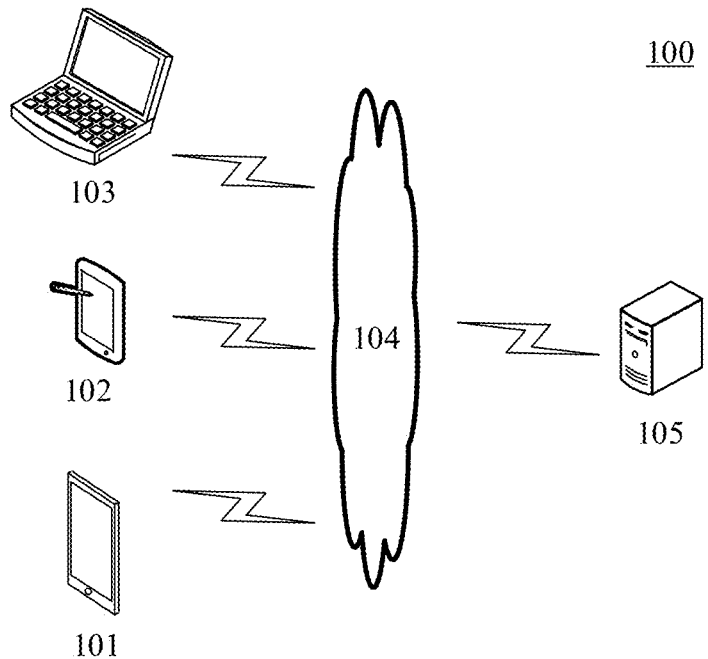
FIG. 1 is an example system architecture to which some embodiments of the present disclosure may be applied.

FIG. 1 shows an example system architecture 100 to which embodiments of a method, apparatus, electronic device and computer-readable storage medium for labeling data according to some embodiments of the present disclosure may be applied.

As shown in FIG. 1, the system architecture 100 may include terminal devices 101, 102, 103, a network 104 and a server 105. The network 104 serves as a medium for providing a communication link between the terminal devices 101, 102, 103 and the server 105. The network 104 may include various types of connections, such as wired or wireless communication links, or optical fiber cables.

A user may use the terminal devices 101, 102, 103 to interact with the server 105 through the network 104 to receive or send messages. Various applications for implementing information communication between the terminal devices 101, 102, 103 and the server 105, such as labeling task assignment applications, labeling process monitoring applications and instant messaging applications, may be installed on the terminal devices 101, 102, 103 and the server 105.

The terminal devices 101, 102, 103 and the server 105 may be hardware or software. When the terminal devices 101, 102, 103 are hardware, the terminal devices 101, 102, 103 may be various electronic devices having a display screen, including but not limited to, a smart phone, a tablet computer, a laptop portable computer and a desktop computer; and when the terminal devices 101, 102, 103 are software, the terminal devices 101, 102, 103 may be installed in the electronic devices, and may be implemented as multiple software pieces or software modules, or as a single software piece or software module, which is not specifically limited herein. When the server 105 is hardware, the server 105 may be implemented as a distributed server cluster composed of multiple servers, or as a single server; and when the server 105 is software, the server 105 may be implemented as multiple software pieces or software modules, or as a single software piece or software module, which is not specifically limited herein.

The server 105 may provide various services through various built-in applications. Taking a labeling control application that may provide a labeling accuracy control service for to-be-labeled data as an example, the server 105 may realize the following effects when running the labeling control application: a labeling accuracy requirement for to-be-labeled data is first obtained; a process monitoring parameter matching the to-be-labeled data is determined, where the process monitoring parameter includes at least one of accuracies of multiple dimensions in an increasing order of levels; then, the process monitoring parameter is weighted with a coefficient having a corresponding value to obtain a comprehensive accuracy according to dependent and causal relationships between contents of different to-be-labeled data; and finally, in response to the comprehensive accuracy satisfying the labeling accuracy requirement, labeled data is output.

Since the monitoring and control of the labeling process require many computing resources and strong computing capabilities, the method for labeling data provided by subsequent embodiments of the present disclosure is generally executed by the server 105 with many computing resources and strong computing capabilities, and correspondingly, the apparatus for labeling data is generally arranged in the server 105.

It should be appreciated that the number of the terminal devices, the network, the server in FIG. 1 is merely illustrative. Any number of terminal devices, networks, and servers may be provided according to actual requirements.

Figure 2:
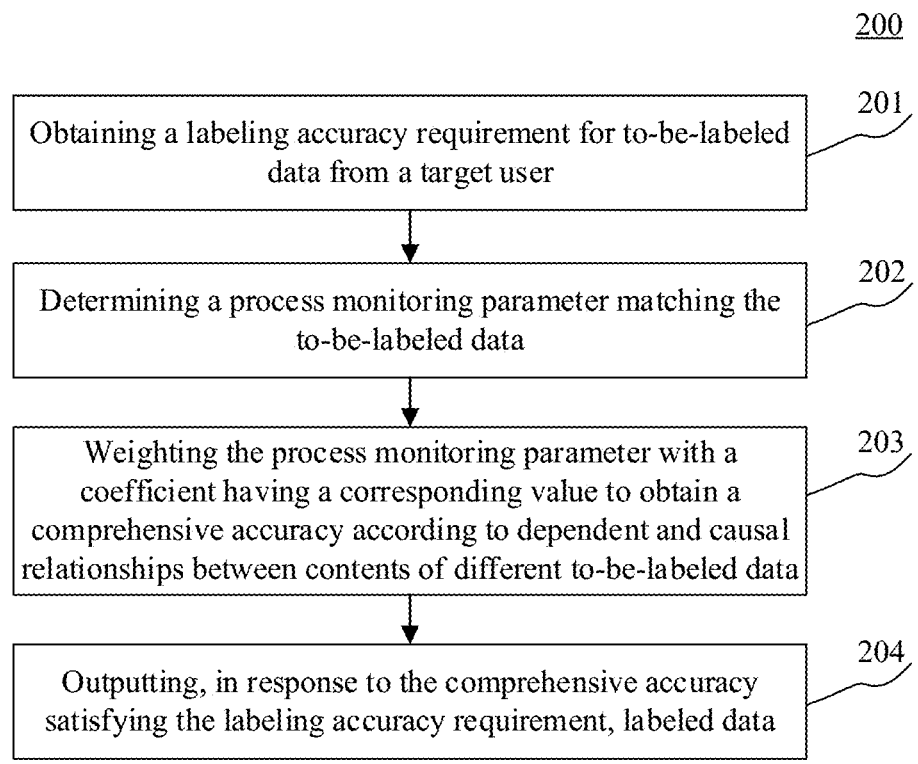
FIG. 2 is a flowchart of a method for labeling data according to some embodiments of the present disclosure.

Referring to FIG. 2, FIG. 2 is a flowchart of the method for labeling data according to some embodiments of the present disclosure, and the flow 200 includes steps 201 to 204.

Step 201 includes obtaining a labeling accuracy requirement for to-be-labeled data.

This step is intended to obtain the labeling accuracy requirement for the to-be-labeled data by an execution body of the method for labeling data (such as the server 105 shown in FIG. 1). The labeling accuracy requirement is generally a requirement for a final result, for example, a comprehensive labeling accuracy should be above 90%. The labeling accuracy requirement may alternatively include accuracy requirements for some intermediate labeled parameters or some intermediate process data.

Specifically, the to-be-labeled data and the labeling accuracy requirement for the to-be-labeled data may be directly obtained by the execution body from a local storage device, or may be obtained from a non-local storage device (such as a labeling demand terminal not shown in FIG. 1). The local storage device may be a data storage module arranged in the execution body, such as a server hard disk, and in this case, the to-be-labeled data and the labeling accuracy requirement for the to-be-labeled data may be quickly read locally. The non-local storage device may be any other electronic device configured to store data, such as some user terminals, and in this case, the execution body may obtain the desired to-be-labeled data and the labeling accuracy requirement for the to-be-labeled data by transmitting an obtaining command to the electronic device. In addition, the to-be-labeled data and the labeling accuracy requirement may be stored at different positions, respectively.

Step 202 includes determining a process monitoring parameter matching the to-be-labeled data.

On the basis of the step 201, this step is intended to determine the process monitoring parameter matching the to-be-labeled data by the execution body. The process monitoring parameter refers to a parameter for performing accuracy monitoring in a process of labeling the to-be-labeled data. The process monitoring parameter is intended to describe the to-be-labeled data at different levels, as that intermediate monitoring parameters of multiple levels are formed. The matching process is to determine how many parameters and which parameters are selected as the actual process monitoring parameter according to actual situations of the to-be-labeled data (such as a type, a requirement, a characteristic and an actual maximum difference between the levels), so that the intermediate labeling process is fully described, thereby realizing the control of the intermediate labeling process.

Specifically, the process monitoring parameter may include at least one of an accuracy of an element dimension, an accuracy of a data dimension, an accuracy of a topic dimension, an accuracy of a page dimension and an accuracy of a batch dimension, and the element dimension, the data dimension, the topic dimension, the page dimension and the batch dimension are in an increasing order of levels, where the element dimension refers to a smallest unit of labeled information, and a next dimension is an aggregation of multiple last previous dimensions, which may be alternatively understood as that a next dimension is an aggregation of a last previous dimension.

For example, the element dimension is a bottom level of the to-be-labeled data. Taking a calibration box as an example, the element dimension may be a side of the calibration box or the calibration box itself, and the data dimension may be all calibration boxes included in a picture, and the topic dimension may be all pictures included in a topic, and the page dimension may be all topics included in a page, and the batch dimension may be all pages provided in a batch, so that accuracies of aggregated dimensions of multiple levels are formed.

Step 203 includes weighting the process monitoring parameter with a coefficient having a corresponding value to obtain a comprehensive accuracy according to dependent and causal relationships between contents of different to-be-labeled data.

On the basis of the step 202, this step is intended to weight the process monitoring parameter with the coefficient having the corresponding value by the execution body to obtain the comprehensive accuracy that may objectively and effectively describe the accuracy according to the dependent and causal relationships between the contents of the different to-be-labeled data.

It should be understood that, for pieces of to-be-labeled data having the causal relationship, if the piece of to-be-labeled data used as a "cause" is labeled wrong, all subsequent pieces of to-be-labeled data used as "effects", which are subsequently labeled based on the "cause", will lose their reference significance.

Step 204 includes outputting, in response to the comprehensive accuracy satisfying the labeling accuracy requirement, labeled data.

On the basis of the step 203, this step is aimed at that in a situation where the comprehensive accuracy satisfies the labeling accuracy requirement, the execution body considers that the labeled data satisfies a delivery requirement, and outputs the labeled data.

According to technical schemas provided by some embodiments of the present disclosure, the appropriate process monitoring parameter is first determined to monitor the labeling process, and in combination with the causal and dependent relationships between the different contents of the to-be-labeled data in the monitoring of the labeling process, the weighting coefficient conforming to the causal and dependent relationships is set, so that the comprehensive accuracy obtained after the weighting can describe the actual labeling situation more accurately, thereby avoiding the generation of invalid labeling work and improving the labeling efficiency based on the control of the comprehensive accuracy.

Figure 3:
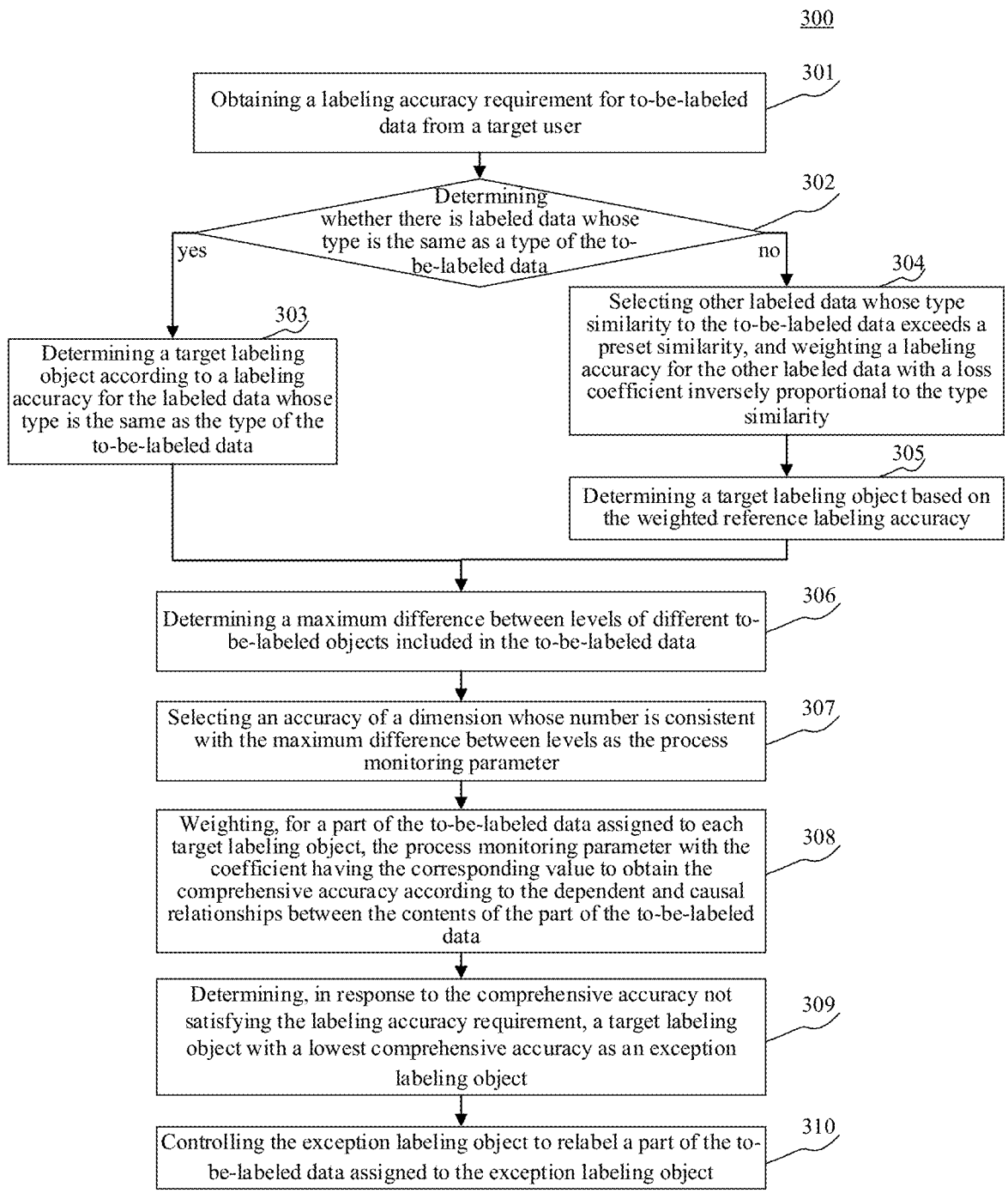
FIG. 3 is another flowchart of the method for labeling data according to some embodiments of the present disclosure.

Referring to FIG. 3, FIG. 3 is another flowchart of the method for labeling data according to some embodiments of the present disclosure, and the flow 300 includes steps 301 to 310.

Step 301 includes obtaining a labeling accuracy requirement for to-be-labeled data.

The step 301 is consistent with the step 201 shown in FIG. 2, and the contents of the step 301 may be referred to the corresponding contents of the step 201, and are not described in detail herein.

Step 302 includes determining whether there is labeled data whose type is the same as a type of the to-be-labeled data, and executing step 303 if there is labeled data whose type is the same as the type of the to-be-labeled data, or executing step 304 if there is no labeled data whose type is the same as a type of the to-be-labeled data.

Step 303 includes determining a target labeling object according to a labeling accuracy for the labeled data whose type is the same as the type of the to-be-labeled data.

This step is intended to determine the appropriate target labeling object for labeling the to-be-labeled data by the execution body based on the labeling accuracy requirement. Since the to-be-labeled data is not labeled yet, a labeling accuracy of each labeling object for the to-be-labeled data cannot be directly obtained. Therefore, this step finds the labeled data of the same type through a data type to determine which labeling object in the past had an actual labeling accuracy satisfying a labeling accuracy for data of the same type. The labeling object may be a labeling person, a labeling model with different labeling capabilities, or various existing forms with labeling capabilities.

Step 304 includes selecting other labeled data whose type similarity to the to-be-labeled data exceeds a preset similarity, and weighting a labeling accuracy for the other labeled data with a loss coefficient inversely proportional to the type similarity.

Different form the step 303, this step is established in a situation where there is no labeled data whose type is the same as the type of the to-be-labeled data does, and for this situation, this step provides an alternative schema in which the other labeled data whose type similarity to the to-be-labeled data exceeds the preset similarity is selected, and the labeling accuracy for the other labeled data is weighted with the loss coefficient.

A value of the loss coefficient used in this step is inversely proportional to the type similarity, that is, the higher the type similarity between the other labeled data and the to-be-labeled data is, the smaller the loss coefficient is, or the lower the type similarity between the other labeled data and the to-be-labeled data is, the greater the loss coefficient is. A smaller loss coefficient means that a result obtained by weighting with the smaller loss coefficient is closer to an original labeling accuracy, and a greater loss coefficient means that a result obtained by weighting with the greater loss coefficient is more different from an original labeling accuracy.

Taking a type similarity of 80% as an example, a loss coefficient of the type similarity may be 10%, and in an actual weighting calculation method, if a labeling accuracy for the other labeled data is 90%, a reference labeling accuracy after weighted by the loss coefficient is: 90%×(1-10%)=81%.

Step 305 includes determining a target labeling object based on the weighted reference labeling accuracy.

On the basis of the step 304, this step is intended to determine the target labeling object by the execution body based on the weighted reference labeling accuracy. Assuming that the labeling accuracy is required to be 80%, only a labeling object with a labeling accuracy greater than 89% for other labeled data may be selected as the target labeling object according to the example of the step 304.

Step 306 includes determining a maximum difference between levels of different to-be-labeled objects included in the to-be-labeled data.

Step 307 includes selecting an accuracy of a dimension whose number is consistent with the maximum difference of levels as the process monitoring parameter.

On the basis of the generic concept provided by the step 202 in the embodiment shown in FIG. 2, this embodiment provides, through the steps 306 to 307, a scheme in which the process monitoring parameter is specifically determined by the maximum difference between levels of the different to-be-labeled objects included in the to-be-labeled data, that is, the accuracy of the dimension whose number is consistent with the maximum difference of levels as the process monitoring parameter.

The maximum difference of levels between the different to-be-labeled objects refers to a parameter of a level relationship between the to-be-labeled objects. For example, a minimum level of the to-be-labeled objects is a food in a refrigerator, and the food is specifically placed in a second cell of a freezing area of a lower half of the refrigerator, so the difference between the minimum level of the to-be-labeled objects and the maximum level of the to-be-labeled objects is 4 levels. In this case, if a dimension of the food at the bottom level corresponds to the accuracy of the element dimension, the four levels may be set as the accuracy of the element dimension, the accuracy of the data dimension, the accuracy of the topic dimension, and the accuracy of the page dimension, respectively.

Step 308 includes weighting, for a part of the to-be-labeled data assigned to each target labeling object, the process monitoring parameter with the coefficient having the corresponding value to obtain the comprehensive accuracy according to the dependent and causal relationships between the contents of the part of the to-be-labeled data.

An implementation includes, but is not limited to: setting, in response to a previous labeling result of at least two labeling results that have the dependent or causal relationship being wrong, a coefficient of a posterior labeling result to zero. That is, for pieces of the to-be-labeled data having the causal relationship, if a piece of the to-be-labeled data used as a "cause" is labeled wrong, all subsequent to-be-labeled data used as "effects", which are subsequently labeled based on the "cause", will lose their reference significance.

Step 309 includes determining, in response to the comprehensive accuracy not satisfying the labeling accuracy requirement, a target labeling object with a lowest individual comprehensive accuracy as an exception labeling object.

Step 310 includes controlling the exception labeling object to re-label the part of the to-be-labeled data assigned to the exception labeling object.

Different from a situation where the comprehensive accuracy of the embodiment shown in FIG. 2 satisfies the labeling accuracy requirement, this embodiment is intended to supplementally describe, through the steps 309 to 310, a situation where the comprehensive accuracy does not satisfy the labeling accuracy requirement. That is, the target labeling object with the lowest comprehensive accuracy is first determined as the exception labeling object, and then the exception labeling object is controlled to re-label the part of the to-be-labeled data assigned to the exception labeling object, so that the comprehensive accuracy may be ensured as much as possible to satisfy a delivery requirement. If a good effect is still not realized after relabeling, the exception labeling object may be replaced, for example, may be replaced with an alternative labeling object to repeatedly label the part of the to-be-labeled data that needs to be re-labeled.

In this embodiment, the schema for how to select the appropriate labeling object for the subsequent labeling is provided through the steps 302 to 305; the specific implementation for determining the appropriate process monitoring parameter based on the actual maximum difference of levels between the to-be-labeled data is provided through the steps 306 to 307; and the other situation different from the embodiment shown in FIG. 2 is provided through the steps 308 to 310, that is, the situation where the comprehensive accuracy does not satisfy the delivery requirement is provided.

It should be understood that the three specific or branch supplements provided by this embodiment, which are different from the previous embodiment, does not have dependent and causal relationships, and may respectively form multiple embodiments in combination with the embodiment shown in FIG. 2. This embodiment only exists as a preferred embodiment including the three specific or branch supplements at the same time.

To improve understanding, the present disclosure further provides a specific implementation in combination with a specific application scenario.

1) A cloud server receives to-be-labeled data from a client and a labeling accuracy requirement that a comprehensive labeling accuracy for the to-be-labeled data is not lower than 90%.

2) The cloud server analyzes a technical field to which the to-be-labeled data of a text type belongs through a natural language processing technology, and obtains a conclusion that the to-be-labeled data of the text type belongs to a technical text in a technical field of A.

3) The cloud server queries whether the technical text in the technical field of A has been labeled before, finds that the technical text has been labeled before, and invokes historical labeling accuracies of multiple labeling objects labeled before in the technical field of A.

4) The cloud server selects six labeling objects whose historical labeling accuracies are higher than 90% as alternative labeling objects, and selects three of the six labeling objects as target labeling object (respectively named as A1, A2 and A3) in a descending order of the labeling accuracies.

5) The cloud server divides the to-be-labeled data into 3 portions, respectively assigns the 3 portions to terminal devices on which A1, A2 and A3 are respectively located, transmits a process monitoring parameter requirement with a level difference of 3, and transmits a weighting logic based on a causal relationship of contents.

6) The terminal devices analyze and process labeling results according to the received to-be-labeled data, the requirements and the weighting logic, and report to the cloud server when there is an exception.

7) The cloud server finds that a labeling accuracy for a part of the to-be-labeled data assigned to the labeling object of A3 is zero, so that a comprehensive accuracy of the labeling object of A3 is lower than 90%. Therefore, the cloud server determines that the labeling object of A3 has a serious labeling error of data used as "cause" in different to-be-labeled data having a causal relationship, and provides the labeling object of A3 another labeling opportunity.

8) The cloud server analyzes a re-labeling result of A3 again, finds that the comprehensive labeling accuracy of A3 is 93%, which is between comprehensive labeling accuracies of A1 and A2, determines that the all comprehensive labeling accuracies satisfy the delivery requirement, and outputs labeled data to the client.

Figure 4:
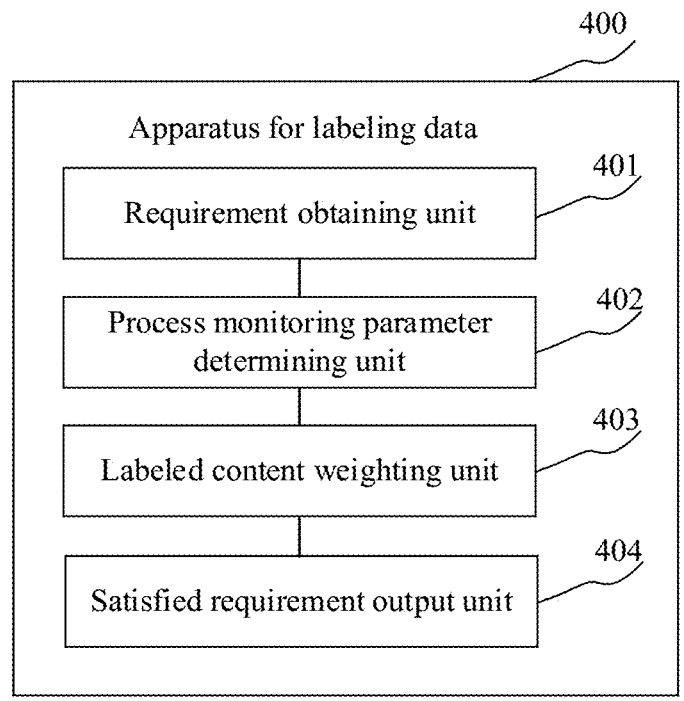
FIG. 4 is a structural block diagram of an apparatus for labeling data according to some embodiments of the present disclosure.

Further referring to FIG. 4, as an implementation of the method shown in each of the above figures, the present disclosure provides an embodiment of an apparatus for labeling data. The embodiment of the apparatus corresponds to the embodiment of the method shown in FIG. 2, and the apparatus is particularly applicable to various electronic devices.

As shown in FIG. 4, the apparatus 400 for labeling data of this embodiment may include a requirement obtaining unit 401, a process monitoring parameter determining unit 402, a labeled content weighting unit 403 and a satisfied requirement output unit 404. The requirement obtaining unit 401 is configured to obtain a labeling accuracy requirement for to-be-labeled data; the process monitoring parameter determining unit 402 is configured to determine a process monitoring parameter matching the to-be-labeled data, where the process monitoring parameter includes at least one of accuracies of multiple dimensions in an increasing order of levels; the labeled content weighting unit 403 is configured to weight the process monitoring parameter with a coefficient having a corresponding value to obtain a comprehensive accuracy according to dependent and causal relationships between contents of different to-be-labeled data; and the satisfied requirement output unit 404 is configured to output, in response to the comprehensive accuracy satisfying the labeling accuracy requirement, labeled data.

In this embodiment, the specific processing of the requirement obtaining unit 401, the process monitoring parameter determining unit 402, the labeled content weighting unit 403 and the satisfied requirement output unit 404 of the apparatus 400 for labeling data and the technical effects thereof may be described with reference to the related description of steps 201 to 204 in the embodiment corresponding to FIG. 2, and are not described in detail herein.

In some alternative implementations of this embodiment, the labeled content weighting unit 403 may be further configured to:

set, in response to a previous labeling result of at least two labeling results that have the dependent or causal relationship being wrong, a coefficient of a posterior labeling result to zero.

In some alternative implementations of this embodiment, the apparatus 400 for labeling data may further include:

a target labeling object determining unit configured to select labeled data whose type is the same as a type of the to-be-labeled data, and determine a target labeling object according to a labeling accuracy for the labeled data, before weighting the process monitoring parameter with a coefficient having a corresponding value to obtain a comprehensive accuracy according to dependent and causal relationships between contents of different to-be-labeled data; and the labeled content weighting unit 403 may be further configured to:

weight, for a part of the to-be-labeled data assigned to each target labeling object, the process monitoring parameter with the coefficient having the corresponding value according to the dependent and causal relationships between the contents of the part of the to-be-labeled data.

In some alternative implementations of this embodiment, the process monitoring parameter includes at least one of accuracies of an element dimension, a data dimension, a topic dimension, a page dimension and a batch dimension in an increasing order of levels, where the element dimension refers to a smallest unit of labeled information, and a next dimension is an aggregation of multiple last previous dimensions.

In some alternative implementations of this embodiment, the process monitoring parameter determining unit 402 may be further configured to:

determine a maximum difference between levels of different to-be-labeled objects included in the to-be-labeled data; and select an accuracy of multiple dimensions whose number is consistent with the maximum difference between levels as the process monitoring parameter.

In some alternative implementations of this embodiment, the apparatus 400 for labeling data may further include:

an exception labeling object determining unit configured to determine, in response to the comprehensive accuracy not satisfying the labeling accuracy requirement, a target labeling object with a lowest individual comprehensive accuracy as an exception labeling object; and an exception handling apparatus unit configured to control the exception labeling object to re-label a part of the to-be-labeled data assigned to the exception labeling object.

This embodiment exists as the embodiment of the apparatus corresponding to the embodiment of the method. According to the apparatus for labeling data provided by this embodiment, the appropriate process monitoring parameter is first determined to monitor the labeling process, and in combination with the causal and dependent relationships between the different contents of the to-be-labeled data in the monitoring of the labeling process, the weighting coefficient conforming to the causal and dependent relationships is set, so that the comprehensive accuracy obtained after the weighting can describe the actual labeling situation more accurately, thereby avoiding the generation of invalid labeling work and improving the labeling efficiency based on the control of the comprehensive accuracy.

According to embodiments of the present disclosure, the present disclosure further provides an electronic device, a readable storage medium and a computer program product.

Figure 5:
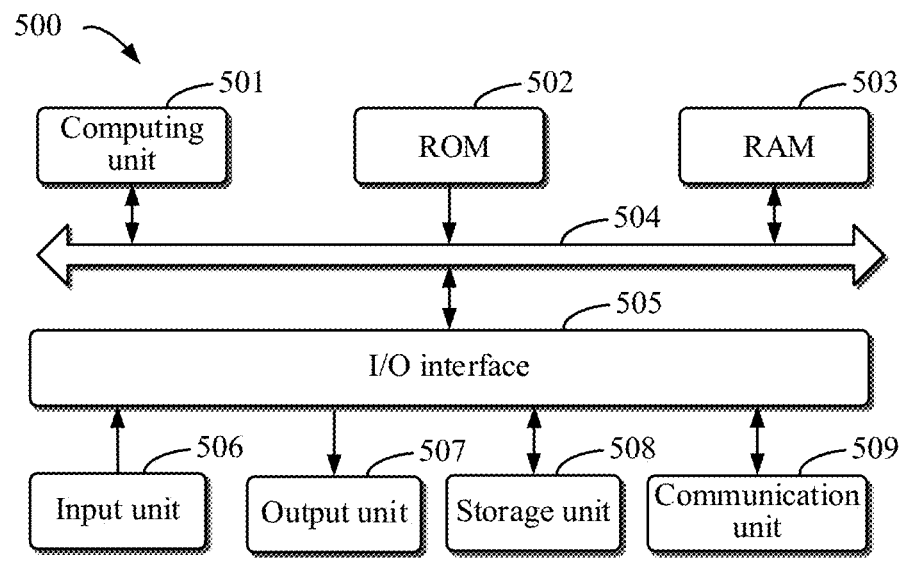
FIG. 5 is a schematic structural diagram of an electronic device adapted to execute the method for labeling data according to some embodiments of the present disclosure.

FIG. 5 shows a schematic block diagram of an electronic device 500 adapted to implement some embodiments of the present disclosure. The electronic device is intended to represent various forms of digital computers, such as laptops, desktops, worktables, personal digital assistants, servers, blade servers, mainframe computers and other suitable computers. The electronic device may alternatively represent various forms of mobile devices, such as personal digital processing, cellular phones, smart phones, wearable devices and other similar computing devices. The components, their connections and relationships, and their functions shown herein are examples only, and are not intended to limit the implementations of the present disclosure as described and/or claimed herein.

As shown in FIG. 5, the device 500 may include a computing unit 501, which may execute various appropriate actions and processes in accordance with a computer program stored in a read-only memory (ROM) 502 or a computer program loaded into a random-access memory (RAM) 503 from a storage unit 508. The RAM 503 may alternatively store various programs and data required by operations of the device 500. The computing unit 501, the ROM 502 and the RAM 503 are connected to each other through a bus 504. An input/output (I/O) interface 505 is also connected to the bus 504.

Multiple components of the device 500 are connected to the I/O interface 505, and include: an input unit 506, such as a keyboard and a mouse; an output unit 507, such as various types of displays and a speaker; a storage unit 508, such as a magnetic disk and an optical disk; and a communication unit 509, such as a network card, a modem and a wireless communication transceiver. The communication unit 509 allows the device 500 to exchange information or data with other devices through a computer network, such as the Internet and/or various telecommunications networks.

The computing unit 501 may be various general-purpose and/or specific-purpose processing components having processing and computing capabilities. Some examples of the computing unit 501 include, but are not limited to, a central processing unit (CPU), a graphics processing unit (GPU), various specific artificial intelligence (AI) computing chips, various computing units running machine learning model algorithms, a digital signal processor (DSP), and any appropriate processor, controller, microcontroller and the like. The computing unit 501 performs various methods and processing described above, such as the method for labeling data. For example, in some embodiments, the method for labeling data may be implemented as a computer software program, which is tangibly included in a machine-readable medium, such as the storage unit 508. In some embodiments, part or all of the computer program may be loaded and/or installed on the device 500 through the ROM 502 and/or the communication unit 509. When the computer program is loaded into the RAM 503 and executed by the computing unit 501, one or more steps of the method for labeling data described above may be performed. Alternatively, in other embodiments, the computing unit 501 may be configured to perform the method for labeling data in any other appropriate manner (such as through firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a specific-purpose or general-purpose programmable processor, which may receive data and instructions from a storage system, at least one input device and at least one output device, and send the data and instructions to the storage system, the at least one input device and the at least one output device.

Program codes used to implement the method of some embodiments of the present disclosure may be written in any combination of one or more programming languages. These program codes may be provided to a processor or controller of a general-purpose computer, specific-purpose computer or other programmable data processing apparatus, so that the program codes, when executed by the processor or controller, cause the functions or operations specified in the flowcharts and/or block diagrams to be implemented. These program codes may be executed entirely on a machine, partly on the machine, partly on the machine as a standalone software package and partly on a remote machine, or entirely on the remote machine or a server.

In the context of some embodiments of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more specific example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The server may be a cloud server, also known as a cloud computing server or a cloud host, which is a host product in a cloud computing service system and may solve the defects of difficult management and weak service scalability existing in a conventional physical host and a VPS (Virtual Private Server) service.

According to the technical schema provided by this embodiment, the appropriate process monitoring parameter is first determined to monitor the labeling process, and in combination with the causal and dependent relationships between the different contents of the to-be-labeled data in the monitoring of the labeling process, the weighting coefficient conforming to the causal and dependent relationships is set, so that the comprehensive accuracy obtained after the weighting can describe the actual labeling situation more accurately, thereby avoiding the generation of invalid labeling work and improving the labeling efficiency based on the control of the comprehensive accuracy.

It should be appreciated that the steps of reordering, adding or deleting may be executed using the various forms shown above. For example, the steps described in some embodiments of the present disclosure may be executed in parallel or sequentially or in a different order, so long as the expected results of the technical schemas provided in the present disclosure may be realized, and no limitation is imposed herein.

The above specific implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for labeling data, the method comprising:
obtaining a labeling accuracy requirement for to-be-labeled data;
determining a process monitoring parameter matching the to-be-labeled data, wherein the process monitoring parameter comprises at least one of accuracies of a plurality of dimensions in an increasing order of levels;
weighting the process monitoring parameter with a coefficient having a corresponding value to obtain a comprehensive accuracy according to dependent and causal relationships between contents of different to-be-labeled data; and
outputting, in response to the comprehensive accuracy satisfying the labeling accuracy requirement, labeled data.

2. The method according to claim 1, wherein weighting the process monitoring parameter with the coefficient having the corresponding value to obtain the comprehensive accuracy according to the dependent and causal relationships between the contents of different to-be-labeled data, comprises:
setting, in response to determining that a previous labeling result of at least two labeling results that have the dependent or causal relationship is wrong, a coefficient of a posterior labeling result to zero.

3. The method according to claim 1, wherein before weighting the process monitoring parameter with the coefficient having the corresponding value to obtain the comprehensive accuracy according to the dependent and causal relationships between the contents of different to-be-labeled data, the method further comprises:
selecting labeled data whose type is the same as a type of the to-be-labeled data, and determining a target labeling object according to a labeling accuracy for the labeled data;
wherein weighting the process monitoring parameter with the coefficient having the corresponding value to obtain the comprehensive accuracy according to the dependent and causal relationships between the contents of different to-be-labeled data, comprises:
weighting, for a part of the to-be-labeled data assigned to each target labeling object, the process monitoring parameter with the coefficient having the corresponding value according to the dependent and causal relationships between the contents of the part of the to-be-labeled data.

4. The method according to claim 1, wherein the process monitoring parameter comprises at least one of: accuracies of an element dimension, a data dimension, a topic dimension, a page dimension and a batch dimension, wherein the element dimension, the data dimension, the topic dimension, the page dimension and the batch dimension are in an increasing order of levels, wherein the element dimension refers to a smallest unit of labeled information, and a next dimension is an aggregation of a plurality of last previous dimensions.

5. The method according to claim 4, wherein determining the process monitoring parameter matching the to-be-labeled data, comprises:
determining a maximum difference between levels of different to-be-labeled objects comprised in the to-be-labeled data; and
selecting an accuracy of a dimension whose number is consistent with the maximum difference as the process monitoring parameter.

6. The method according to claim 1, the method further comprising:
determining, in response to determining that the comprehensive accuracy does not satisfy the labeling accuracy requirement, a target labeling object with a lowest individual comprehensive accuracy as an exception labeling object; and
controlling the exception labeling object to relabel a part of the to-be-labeled data assigned to the exception labeling object.

7. An apparatus for labeling data, the apparatus comprising:
one or more processors; and
a storage device storing one or more programs, wherein the one or more programs, when executed by the one or more processors, cause the one or more processors to perform operations comprising:
obtaining a labeling accuracy requirement for to-be-labeled data;
determining a process monitoring parameter matching the to-be-labeled data, wherein the process monitoring parameter comprises at least one of accuracies of a plurality of dimensions in an increasing order of levels;
weighting the process monitoring parameter with a coefficient having a corresponding value to obtain a comprehensive accuracy according to dependent and causal relationships between contents of different to-be-labeled data; and
outputting, in response to the comprehensive accuracy satisfying the labeling accuracy requirement, labeled data.

8. The apparatus according to claim 7, wherein weighting the process monitoring parameter with the coefficient having the corresponding value to obtain the comprehensive accuracy according to the dependent and causal relationships between the contents of different to-be-labeled data, comprises:
setting, in response to determining that a previous labeling result of at least two labeling results that have the dependent or causal relationship is wrong, a coefficient of a posterior labeling result to zero.

9. The apparatus according to claim 7, wherein the operations further comprise:
selecting labeled data whose type is the same as a type of the to-be-labeled data, and determining a target labeling object according to a labeling accuracy for the labeled data, before the weighting the process monitoring parameter with a coefficient having a corresponding size to obtain a comprehensive accuracy according to dependent and causal relationships between contents of different to-be-labeled data;
wherein weighting the process monitoring parameter with the coefficient having the corresponding value to obtain the comprehensive accuracy according to the dependent and causal relationships between the contents of different to-be-labeled data, comprises:
weighting, for a part of the to-be-labeled data assigned to each target labeling object, the process monitoring parameter with the coefficient having the corresponding value according to the dependent and causal relationships between the contents of the part of the to-be-labeled data.

10. The apparatus according to claim 7, wherein the process monitoring parameter comprises at least one of:

accuracies of an element dimension, a data dimension, a topic dimension, a page dimension and a batch dimension, wherein the element dimension, the data dimension, the topic dimension, the page dimension and the batch dimension are in an increasing order of levels, wherein the element dimension refers to a smallest unit of labeled information, and a next dimension is an aggregation of a plurality of last previous dimensions.

11. The apparatus according to claim 10, wherein determining the process monitoring parameter matching the to-be-labeled data, comprises:
    determining a maximum difference between levels of different to-be-labeled objects comprised in the to-be-labeled data; and
    selecting an accuracy of a dimension whose number is consistent with the maximum difference as the process monitoring parameter.

12. The apparatus according to claim 7, wherein the operations further comprise:
    determining, in response to determining that the comprehensive accuracy does not satisfy the labeling accuracy requirement, a target labeling object with a lowest individual comprehensive accuracy as an exception labeling object; and
    controlling the exception labeling object to relabel a part of the to-be-labeled data assigned to the exception labeling object.

13. A non-transitory computer-readable storage medium storing computer instructions, that when executed by a computer, cause the computer to perform operations comprising:
    obtaining a labeling accuracy requirement for to-be-labeled data;
    determining a process monitoring parameter matching the to-be-labeled data, wherein the process monitoring parameter comprises at least one of accuracies of a plurality of dimensions in an increasing order of levels;
    weighting the process monitoring parameter with a coefficient having a corresponding value to obtain a comprehensive accuracy according to dependent and causal relationships between contents of different to-be-labeled data; and
    outputting, in response to the comprehensive accuracy satisfying the labeling accuracy requirement, labeled data.

14. The storage medium according to claim 13, wherein weighting the process monitoring parameter with the coefficient having the corresponding value to obtain the comprehensive accuracy according to the dependent and causal relationships between the contents of different to-be-labeled data, comprises:
    setting, in response to determining that a previous labeling result of at least two labeling results that have the dependent or causal relationship is wrong, a coefficient of a posterior labeling result to zero.

15. The storage medium according to claim 13, wherein the operations further comprise:
    selecting labeled data whose type is the same as a type of the to-be-labeled data, and determining a target labeling object according to a labeling accuracy for the labeled data, before the weighting the process monitoring parameter with a coefficient having a corresponding size to obtain a comprehensive accuracy according to dependent and causal relationships between contents of different to-be-labeled data;
    wherein weighting the process monitoring parameter with the coefficient having the corresponding value to obtain the comprehensive accuracy according to the dependent and causal relationships between the contents of different to-be-labeled data, comprises:
    weighting, for a part of the to-be-labeled data assigned to each target labeling object, the process monitoring parameter with the coefficient having the corresponding value according to the dependent and causal relationships between the contents of the part of the to-be-labeled data.

16. The storage medium according to claim 13, wherein the process monitoring parameter comprises at least one of: accuracies of an element dimension, a data dimension, a topic dimension, a page dimension and a batch dimension, wherein the element dimension, the data dimension, the topic dimension, the page dimension and the batch dimension are in an increasing order of levels, wherein the element dimension refers to a smallest unit of labeled information, and a next dimension is an aggregation of a plurality of last previous dimensions.

17. The storage medium according to claim 16, wherein determining the process monitoring parameter matching the to-be-labeled data, comprises:
    determining a maximum difference between levels of different to-be-labeled objects comprised in the to-be-labeled data; and
    selecting an accuracy of a dimension whose number is consistent with the maximum difference as the process monitoring parameter.

18. The storage medium according to claim 13, wherein the operations further comprise:
    determining, in response to determining that the comprehensive accuracy does not satisfy the labeling accuracy requirement, a target labeling object with a lowest individual comprehensive accuracy as an exception labeling object; and
    controlling the exception labeling object to relabel a part of the to-be-labeled data assigned to the exception labeling object.

19. A computer program product stored in a storage medium, the computer program product comprising a computer program, wherein the computer program, when executed by a processor, causes the processor to perform the method for labeling data according to claim 1.

* * * * *